Aug. 18, 1931.  A. W. GRANT, JR  1,819,838
MANUFACTURE OF CARBURETED GAS
Filed Jan. 22, 1925  2 Sheets-Sheet 1
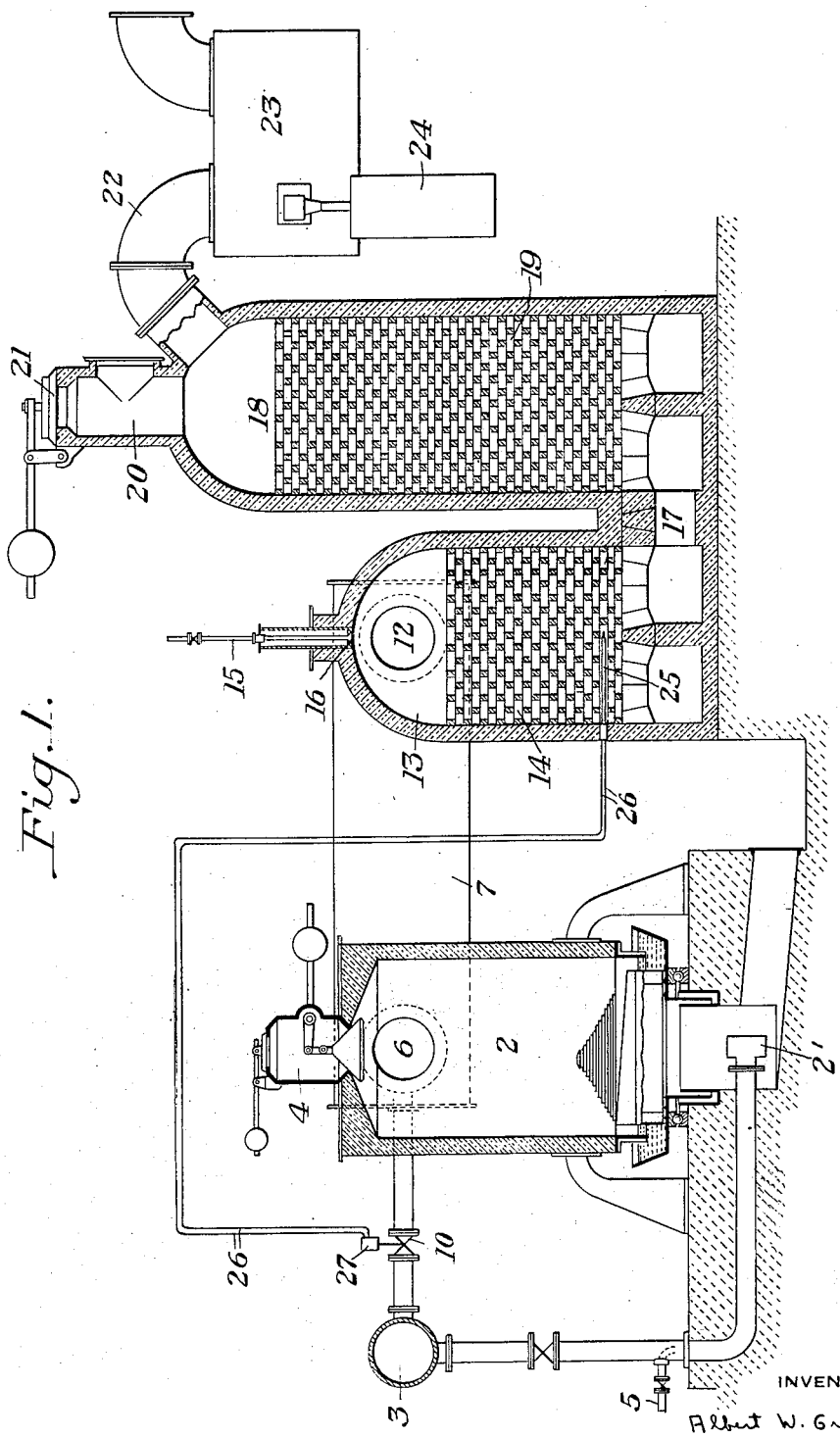
INVENTOR
Albert W. Grant, Jr.
by his attys.
Byrnes, Stebbins & Parmelee

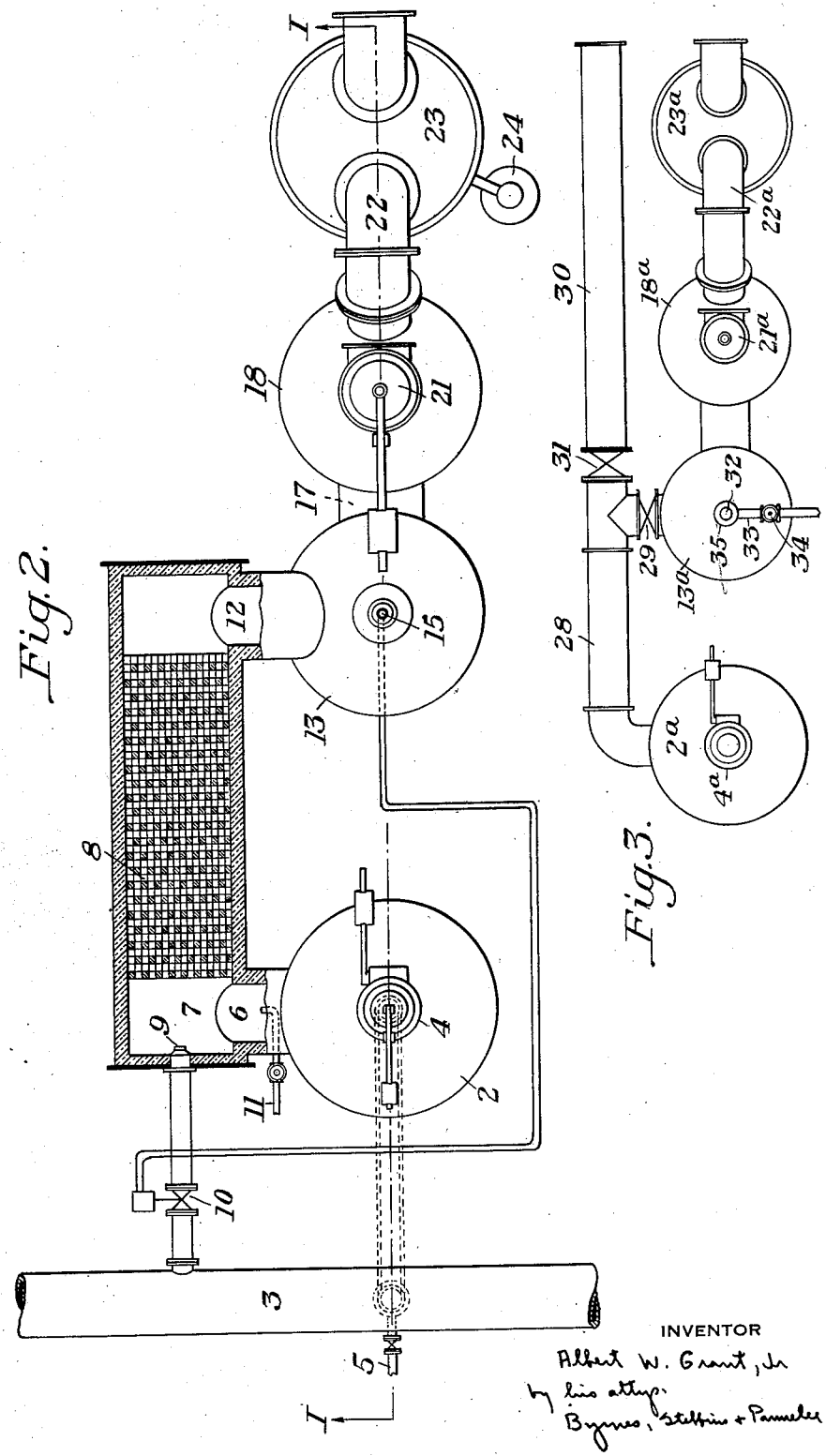

Patented Aug. 18, 1931

1,819,838

UNITED STATES PATENT OFFICE

ALBERT W. GRANT, JR., OF WILMETTE, ILLINOIS, ASSIGNOR TO THE KOPPERS COMPANY, OF PITTSBURGH, PENNSYLVANIA, A CORPORATION OF PENNSYLVANIA

MANUFACTURE OF CARBURETED GAS

Application filed January 22, 1925. Serial No. 3,973.

This invention relates to the manufacture of carbureted gas, and particularly carbureted producer gas.

In the United States patent to Lea, No. 873,250, there is described an apparatus for the manufacture of carbureted producer gas wherein an enriching agent is introduced to the gas and cracked to produce a fixed gas having certain desired characteristics. In this structure, however, the enriching agent is introduced in the presence of air and is partly or wholly burned thereby. I provide for introducing an enriching substance in the absence of oxygen and make the necessary provision for supplying the heat required to crack the enriching oil and form a fixed gas.

I further provide for producing a gas of desired thermal value but of a relatively constant specific gravity by mixing enriched gas and unenriched gas in desired quantities. This is a highly desirable feature in the production of gas for domestic consumption wherein it is desired to supply a gas of substantially constant thermal value, which result may be obtained by mixing the enriched gas with a suitable quantity of unenriched gas. I further provide temperature responsive means whereby the operation of the apparatus may be more efficiently controlled than heretofore.

In the preferred manner of carrying out my invention, I employ an apparatus having a carburettor and supply gas thereto in a substantially continuous manner. Oxygen is supplied in sufficient amounts to cause combustion of a portion of the gas and an enriching agent is supplied to the remaining gas in the absence of oxygen, the heat of combustion of the first mentioned operation being utilized to fix the enriched gas. The oxygen may be supplied either as a constituent of air or in substantially undiluted form. This last may be desirable in certain cases, since it reduces the quantity of inert gas in the final product. The general process may be either continuous or intermittent, depending upon the manner of operation, and the resultant enriched gas may be used alone or mixed with a desired quantity of unenriched gas as desired. In certain cases it may be desirable to supply the heat required for fixing the gas either wholly or in part from some other source than the gas itself. For example, gaseous fuel may be introduced in the apparatus or an oil fuel may be employed.

In the accompanying drawings which illustrate more or less diagrammatically a preferred form of apparatus for carrying out my invention:

Figure 1 is a vertical section taken on the line I—I of Figure 2 and showing a preferred embodiment of the invention;

Figure 2 is a top plan view, partly broken away, of the apparatus illustrated in Figure 1; and Figure 3 is a top plan view showing a modified form of apparatus.

In the embodiment of the invention illustrated in Figures 1 and 2, producer gas is manufactured in a substantially continuous manner in a gas producer indicated generally by the reference character 2. The producer illustrated is of a well known type. Air is supplied to the producer from a main 3, fuel is supplied through a feeder 4 and steam is supplied from a conduit 5. The gas producer 2 is adapted to contain a bed of solid fuel, such as coal or coke.

The gas generated in the producer 2 passes through a conduit 6 into a combustion chamber 7 which is preferably provided with checker brick 8 therein. An air jet 9 connected to the air main 3 is provided at one end of the combustion chamber 7 and air is supplied therethrough, the quantity being regulated by a valve 10.

The producer gas which enters the combustion chamber 7 mixes with the air issuing from the jet 9 and a portion of the producer gas is burned, the amount depending upon the quantity of air supplied. The purpose of the checker brick 8 is to cause a thorough intermingling of the air and gas, and to thus insure that all of the oxygen introduced will be consumed by combustion before the producer gas leaves the combustion chamber 7. If desired, coal gas or other additional fuel such as oil, natural gas, oil gas or the like may be supplied to the combustion chamber, as by a conduit 11, whereby the producer gas may be raised to any desired temperature.

The unconsumed producer gas and products of combustion leave the combustion chamber 7 through a conduit 12 and pass into a carburettor 13. This carburettor 13 is preferably provided with checker work 14. In the carburettor the enriching agent is mixed with the gas entering through the conduit 12. The enriching agent, which is preferably a hydrocarbon oil, is supplied through a conduit 15 and may be preheated if desired. A spray nozzle 16 is provided and the oil passes into the carburettor in the form of a fine spray. The hot gas takes up the sprayed oil and the mixture passes under an arch 17 to a superheater 18 where the mixture is fixed. This superheater is also preferably provided with checker work 19 to assist in the action of fixing the gas.

It will be understood that the functions of vaporization of the oil and the cracking thereof converge closely and are so related to one another that it is impossible to draw a line which would definitely separate the two operations. Hence it is preferred to consider the chambers 13 and 18 as being one wherein the steps of vaporizing the oil and cracking the same into fixed gaseous form are carried out. If desired, one large unit may be provided in place of the two, or if separate units are desired they may be superimposed one upon the other.

A stack 20 having a door 21 is provided on top of the superheater 18 and a conduit 22 having a wash box 23 therein is also provided. This wash box is preferably provided with a water sealed overflow pipe 24.

A temperature responsive element such as a thermocouple 25 is provided in the carburettor 13. This is connected by electric wires 26 to an operating mechanism 27 of any desired form which is connected to the valve 10 for controlling the same in accordance with the carburettor temperature.

As above stated, the apparatus herein described may be used either in an intermittent or a continuous process, and such processes will now be separately described.

*Intermittent operation*

The intermittent operation is performed in two phases, called the first, or heating phase and the second, or carburetting phase. These two operations constitute a cycle and are alternated throughout the operation of the apparatus. The function of the first phase is to raise the temperature of the carburettor, and the term "carburettor" is herein used to include the superheater, to such a point that cracking of the enriching agent in the second phase is supported. The cracking process constitutes vaporization of this enriching agent and fixation of the same into permanent gases. The function of the second phase is to supply gas to the heated carburettor together with an enriching agent so that the thermal value of the lean producer gas is raised.

The producer 2 is operated continuously, primary air saturated with steam being supplied through a blast pipe 2' in such quantities as to support partial combustion of the fuel bed. The resultant producer gas passes out through the conduit 6 into the combustion chamber where air is admitted through the nozzle or tuyère 9, thereby causing combustion of the producer gas and materially raising the temperature thereof. The sensible heat of the burned gases is yielded to the checker brick fillers 14 and 19 within the carburettor and the superheater, and the burned gas may be passed off through the stack 20 or may be passed through the conduit 22 for subsequent use.

This operation is continued until the carburettor reaches a desired temperature as measured by the thermocouple 25. This temperature should be one which will provide a good working margin over the temperature range conducive to good cracking efficiency. It will be understood that any temperature measurements are subject to any number of variables, such as the place in the carburettor where the temperature is measured, the quality and nature of the enriching agent added, and many other factors. In one instance a temperature at the end of the first phase of 1390° F. measured at approximately the position shown in the drawings was found to give good results and a temperature of 1270° F. was found to be the lowest practical point for cracking the enriching agent.

The operation of the mechanism 27 is such that when the desired maximum temperature is reached, the valve 10 is closed, thus shutting off the secondary air and terminating the first phase. The stack valve 21 is then closed so that the gas passes through the conduit 22 and the wash box 23 into the gas main to storage.

A suitable enriching agent, such as oil or tar, is supplied to the carburettor 13 through the conduit 15 and by contact with the heated interior of the carburettor is vaporized, the resultant vapors being cracked or fixed in the form of permanent gases which enrich the relatively lean producer gas. As above stated, the chamber 13 is termed a "carburettor" wherein vaporization of the enriching agent supposedly takes place, while the chamber 18 is termed a "superheater" wherein fixation of the vaporized agent is supposedly accomplished, but it should be understood that there is no clear line of division between the two operations and they may both be carried out in a single chamber.

From the above it will be seen that the enriching is accomplished substantially in the absence of free oxygen and I have found that much higher efficiencies with respect to the conversion of the enriching vapors into fixed gases are accomplished than when such conversion is carried on in the presence of oxygen. This has an important bearing on the efficiency of the apparatus and highly desirable results are attained.

During the second phase of operation, the temperature of the carburetting apparatus falls until it reaches a point below which cracking is no longer efficient. At this time the addition of the enriching agent is stopped, the apparatus is allowed to purge itself of carbureted gas for a short interval, say one minute, and the valve 10 is thereafter opened and secondary air admitted as before. The first phase is then resumed and the two operations are alternated as long as may be desired.

According to the operation as above described an intermittent production of a rich carbureted gas is attained. The quality of this gas may be varied by the usual methods, such as the addition of varying amounts of enriching agent, and it is thus possible to produce a gas having a thermal value ranging from 125 B. t. u. to over 500 B. t. u. per cubic foot. The specific gravity of the carbureted producer gas ranges correspondingly from 0.94 to 0.86. The products of combustion in the first phase have no thermal value and they have a specific gravity of approximately 1.07, which it will be seen does not differ greatly from the enriched gas. It will be seen that the stack gases resulting from the first phase may be mixed with the enriched gas of the second phase in such quantities as to produce a gas of any desired thermal value within a wide range but with only a small variation in specific gravity over that range. This feature is of particular advantage in gas company installations where it may be desired to compensate for variations in thermal value of gas purchased from outside sources. The admixture may be made by operating with the stack valve 21 closed during a part or all of the first phase so that a desired amount of stack gas will mix with the rich gas. In this case a gas holder is generally provided to allow an intimate mixture to be formed, or if desired the stack gases may be collected separately and such amounts of them as desired may be mixed with the rich gas before sale.

In Fig. 3, I have shown an apparatus similar to that illustrated in Figures 1 and 2, but wherein provision is made for heating the carburetting apparatus during the first phase by the combustion of a fuel other than producer gas itself. This fuel, for example, may be a liquid fuel such as the enriching agent and the spray nozzle may be modified so as to permit the supply of air and thus act as a burner during the first phase. In Figure 3, parts corresponding to similar parts in Figures 1 and 2 have been given the same reference character with an "a" suffixed thereto. In this form of apparatus gas is supplied from the producer 2ª through a conduit 28 having a valve 29 therein whereby the gas producer may be separated or connected with the carburettor 13ª. A conduit 30 leading to the gas main or gas holder is also provided and a valve 31 is placed therein. A conduit 32 for the enriching oil leads to the top of the carburettor 13ª and an air line 33 having a valve 34 therein is connected to a nozzle 35 to which the oil conduit 32 leads. With this apparatus the valve 29 is closed during the first phase and air and oil are supplied to the nozzle 35. In this manner the carburetting apparatus may be heated a desired amount and during the heating operation the valve 31 is opened and the producer gas discharges direct into the gas main or gas holder through the conduit 30. When the carburetting apparatus is sufficiently heated, the valve 29 is opened and the valve 31 is closed for the second phase and oil alone is supplied through the nozzle 35 to enrich the producer gas.

In intermittent operation when the products of combustion are wasted through the stack valve 21, it is necessary to maintain a seal within the wash box sufficient to prevent re-entry of gas from the mains. However, when the products of combustion are retained for dilution of the second phase gas, the water seal becomes unnecessary and a spray in the wash box may be substituted if desired.

Continuous operation

In continuous operation of the apparatus the valve 10 is so adjusted as to supply only sufficient air to cause combustion of a desired portion of the producer gas supplied by the producer 2. The checkerbrick in the combustion chamber 7 causes an intimate contact between the producer gas and the secondary air from the tuyère 9, and thereby insures thorough combustion of that part of the producer gas which will combine with air before the gas reaches the carburettor 13. The gases entering the carburettor therefore contain substantially no free oxygen and combustion of the enriching agent is impossible. On this account the formation and deposition of products of combustion of the enriching agent, such as have resulted with structures heretofore employed, is entirely obviated and the apparatus remains clean over a much longer period and a better product results than in cases where the enriching agent is introduced into a gas containing free oxygen in substantial amounts. The operating mechanism 27 in this form of apparatus may be of such nature as to both open and close the valve 10 or to maintain it in intermediate positions, depending upon the temperature registered by the thermocouple 25, and thus maintaining the temperature of the apparatus within a narrow range conducive to the best conditions for cracking the enriching agent.

The quality of the final gas may be varied by controlling the amount and the nature of the enriching agent supplied, and it may also be varied by by-passing a portion of the unburned producer gas around the combustion chamber 7 and the carburetion unit or supplying producer gas from some other source for admixture with the enriched gas.

It may happen that the combustion of the allowable amount of secondary air does not maintain the temperature quite up to the desired point and in this case a gas of higher thermal value such as coal gas may be supplied before combustion with secondary air. Usually only a small amount of such gas is necessary in order to maintain the required temperature. A further variation in operation may be secured by enriching or replacing the primary or secondary air blasts with substantially undiluted oxygen. This is desirable in certain cases in that it reduces materially the amount of inert gases present in the final product.

In the continuous operation where the partially burned and subsequently enriched gases are supplied to the main, the discharge of gas through the conduit 20 is continuous and there is no need for a water seal in the wash box but a spray may be substituted therefor as desired.

I thus provide for making an enriched gas by supplying gas to a carburettor in a substantially continuous manner, supplying an enriching agent to the gas to be enriched and mixing the enriched gas with a desired amount of unenriched gas. The term "unenriched gas" comprehends gases substantially free from hydrocarbon resulting from the cracking of oil, and therefore covers such gases as producer gas or inert gases like the products of combustion of gas. These gases may be of nearly the same specific gravity, so that a gas of substantially constant specific gravity may be manufactured and various conditions encountered in practice may thus be overcome and a product of substantially uniform thermal value achieved. The enriching is preferably carried on in the absence of oxygen and I have found that such operation is conducive toward much better results than have heretofore been attained in apparatus of this character. It will be noted that in either the intermittent or continuous process gas is supplied to the apparatus in a substantially continuous manner, oxygen either as a constituent of air or substantially undiluted is supplied to a portion of the gas to cause combustion thereof and an enriching agent is supplied in the absence of oxygen, the heat of combustion of the first mentioned operation being utilized to fix the enriched gas. In the intermittent process the portion which is burned is supplied during the first phase of operation and the remaining portion is supplied during the second phase, while in the continuous process a part of the gas is continuously burned and the gas is continuously enriched. Further provision is made in the conduit 11 for supplying an additional fuel of higher thermal value, as, for example, coal gas, so as to insure substantially continuous operation and maintenance of a desired cracking temperature.

It will be understood from the above that the term "producer gas" as used herein is employed in the sense in which it is used in the art in this country today, that is, as designating a gas made by continuously passing through a carbonaceous fuel bed a mixture of an oxygen-containing gas and steam (water vapor) in such proportions as to maintain substantially constant temperatures within said fuel bed, as distinguished on the one hand from a gas produced by the use of air alone and on the other hand from "water gas", that is, a gas produced by the use of steam alone.

Temperature responsive means are provided whereby the operation of the apparatus may be automatically confined within desired limits and a general improvement in operation thereby attained.

While I have illustrated a preferred form of my invention, it will be understood that the invention is not limited to this embodiment, but may be otherwise embodied or practiced within the scope of the following claims:

I claim:

1. The process of manufacturing carbureted producer gas, which comprises continuously blasting a bed of incandescent solid carbonaceous fuel with a mixture of an oxygen-containing gas and steam, burning a portion of the gas thereby produced, then introducing a liquid hydrocarbon in a separate chamber to at least a portion of the gas thereby produced, and employing said combustion to furnish the heat required for the permanent volatilization of the liquid hydrocarbon and the consequent enrichment of the gas, the portion of the gas burned being such as to supply sufficient heat for said volatilization and enrichment.

2. The process of manufacturing carbureted producer gas, which comprises continuously blasting a bed of incandescent solid carbonaceous fuel with an oxygen-containing gas saturated with water vapor, burning a portion of the gas thereby produced, introducing a liquid hydrocarbon in a separate chamber to at least a portion of the gas thereby produced at a point where said gas contains substantially no free oxygen, and employing said combustion to furnish the heat required for the permanent volatilization of the liquid hydrocarbon and the consequent enrichment of the gas, the portion of the gas burned being merely such as to supply sufficient heat for said volatilization and enrichment.

3. The process of manufacturing a carbureted producer gas in apparatus consisting of a producer adapted to contain a bed of solid carbinaceous fuel, a combustion chamber and a carburetter, which comprises continuously passing a mixture of an oxygen-containing gas and steam through said fuel bed to generate producer gas, introducing into the gas a supplemental fluid hydrocarbon fuel and a further quantity of an oxygen-containing gas to cause the combustion of a portion only of the mixture of gases thereby produced, causing said combustion of said portion of the gases to complete itself so that the gases are deprived of substantially all free oxygen, then introducing the highly heated and partly burned gases into said carburetter and there enriching said gases, the extent of said partial combustion being sufficient to supply the heat required for said enrichment.

4. The process of manufacturing a carbureted producer gas in apparatus consisting of a producer adapted to contain a bed of solid carbonaceous fuel, a combustion chamber and a carburetter, which comprises continuously passing a mixture of an oxygen-containing gas and steam through said fuel bed to generate producer gas, introducing into the gas a further quantity of an oxygen-containing gas to cause the combustion of a portion only of said gas, causing said combustion of said portion of the gas to complete itself so that the gas is deprived of substantially all free oxygen, then introducing the highly heated and partly burned gas into said carburetter and there enriching said gas, the extent of said partial combustion of the gas being sufficient to supply the heat required for said enrichment.

5. The process of manufacturing a carbureted producer gas in apparatus consisting of a producer adapted to contain a bed of solid carbonaceous fuel, a combustion chamber and a carburetter, which comprises continuously passing a mixture of an oxygen-containing gas and steam through said fuel containing gas and steam through said fuel bed to generate producer gas, introducing into the gas a fluid hydrocarbon fuel of relatively high thermal value and containing substantially no inert constituents and a further quantity of an oxygen-containing gas to cause the combustion of a portion only of the mixture of gases thereby produced, causing said combustion of said portion of the gases to complete itself so that the gases are deprived of substantially all free oxygen, then introducing the highly heated and partly burned gases into said carburetter and there enriching said gases, the extent of said partial combustion being sufficient to supply the heat required for said enrichment.

6. The process of manufacturing a carbureted producer gas in apparatus consisting of a producer adapted to contain a bed of solid carbonaceous fuel, a combustion chamber and a carburetter, which comprises continuously passing a mixture of an oxygen-containing gas and steam through said fuel bed to generate producer gas, introducing into the gas a substantial quantity of coal gas and a further quantity of an oxygen-containing gas to cause the combustion of a portion only of the mixture of gases thereby produced, causing said combustion of said portion of the gases to complete itself so that the gases are deprived of substantially all free oxygen, then introducing the highly heated and partly burned gases into said carburetter and there enriching said gases, the extent of said partial combustion being sufficient to supply the heat required for said enrichment.

7. The process of manufacturing a carbureted producer gas, which comprises continuously blasting a bed of incandescent solid carbonaceous fuel with an oxygen-containing gas saturated with water vapor, introducing substantially undiluted oxygen to the gas thereby produced to burn a portion of said gas, and after the combustion of said portion has been completed introducing a liquid hydrocarbon to the highly heated and partly burned gas to carburet said gas, the amount of substantially undiluted oxygen added to the gas being merely sufficient to cause the combustion of such a portion of the gas as to supply the heat required for the permanent volatilization of said hydrocarbon liquid.

8. The process of manufacturing a carbureted producer gas, which comprises continuously blasting a bed of incandescent solid carbonaceous fuel with an oxygen-containing gas saturated with water vapor, introducing to the gas thereby produced a fluid hydrocarbon fuel of relatively high thermal value and containing substantially no inert constituents, causing the combustion of a portion of the thereby supplemented gas by introducing thereto substantially undiluted oxygen and after the combustion of said portion of the gas has been completed introducing a hydrocarbon liquid to the thereby highly heated gas, the amount of substantially undiluted oxygen introduced being merely sufficient to supply the heat required for the permanent volatilization of said hydrocarbon liquid.

9. The process of manufacturing a carbureted producer gas in apparatus consisting of a producer adapted to contain a bed of solid carbonaceous fuel, a carburetter and means for by-passing said carburetter, which comprises continuously passing a mixture of an oxygen-containing gas and steam through said fuel bed to generate producer gas, at intervals by-passing said producer gas around said carburetter while introducing a hydrocarbon liquid and an oxygen-containing gas to said carburetter for combustion of said liquid therein, and at alternate intervals passing said producer gas through said thereby highly heated carburetter, and then introducing hydrocarbon liquid to said producer gas for carburetion thereof but without simultaneously introducing said oxygen-containing gas to said carburetter.

10. Apparatus for manufacturing carbureted gas comrising in combination, a gas producer adapted to contain a bed of solid carbonaceous fuel, a carburetter and a superheater located in series in the order named, means for introducing an oxygen-containing gas and steam to the bottom of the producer, conduit means for conveying gases thereby produced from the top of the producer to the top of said carburetter, means for introducing secondary air to said conduit means for combustion of gases passing from said producer to said carburetter, means for spraying oil into the top of said carburetter to enrich gas flowing from said producer through said carburetter, and a separate checkerbrick regenerative and combustion chamber located in said conduit means between the point of admission of secondary air and said point of oil admission.

In testimony whereof I have hereunto set my hand.

ALBERT W. GRANT, Jr.